United States Patent [19]

Feutz

[11] 4,288,111
[45] Sep. 8, 1981

[54] JOINT CONSTRUCTION FOR SHEET METAL DUCTS

[75] Inventor: Roger A. Feutz, Grand Rapids, Mich.

[73] Assignee: Enterprise Construction Services, Inc., Grand Rapids, Mich.

[21] Appl. No.: 113,630

[22] Filed: Jan. 21, 1980

[51] Int. Cl.³ .............................................. F16L 43/00
[52] U.S. Cl. .................................. 285/183; 285/410; 285/424
[58] Field of Search ............... 285/365, 366, 367, 373, 285/419, 407, 408, 409, 410, 411, 424, DIG. 4, DIG. 22, 181, 184, 183, 364

[56] References Cited

U.S. PATENT DOCUMENTS

| 944,985 | 12/1909 | Pankhurst et al. | 285/DIG. 4 |
|---|---|---|---|
| 1,043,412 | 11/1912 | Faunce | 285/407 |
| 1,190,350 | 7/1916 | Williams | 285/407 X |
| 1,836,336 | 12/1931 | Replogle | 285/181 |
| 3,544,137 | 12/1970 | Contreras et al. | 285/424 X |
| 3,724,878 | 4/1973 | Ford | 285/367 X |

FOREIGN PATENT DOCUMENTS

| 759344 | 5/1967 | Canada | 285/410 |
|---|---|---|---|
| 83650 | 8/1964 | France | 285/410 |
| 1403744 | 8/1975 | United Kingdom | 285/183 |

*Primary Examiner*—Dave W. Arola
*Attorney, Agent, or Firm*—Price, Heneveld, Huizenga & Cooper

[57] ABSTRACT

A first section of cylindrical sheet metal duct has a end roll-formed to define an outwardly formed flange, a central cylindrical flange whose axis is parallel to the cylindrical wall of the duct and which is radially outwardly offset from the cylindrical wall, and an inwardly formed end flange. This configuration defines a male section and the end of a mating section of cylindrical duct is formed to define a female section having an outwardly formed flange extending from the cylindrical wall and a cylindrical end flange whose axis is parallel to the cylindrical wall and radially outwardly offset from the cylindrical wall with a diameter slightly greater than the diameter of the corresponding cylindrically offset flange of the male section such that the male section can extend into and be seatably received by the female section. A band circumscribes and overlies the junction of the male and female ends of the ductwork and includes an adjustable clamp for tensioning the band thereby securing the sections together.

11 Claims, 3 Drawing Figures

JOINT CONSTRUCTION FOR SHEET METAL DUCTS

BACKGROUND OF THE INVENTION

The present invention relates to ductwork and particularly to joint construction therefor.

Ductwork for heating and cooling systems are typically fabricated on-site particularly in commerical installations which require frequent joining of duct sections each of which are several feet long. The joint construction can and has usually been accomplished by overlapping the ends of sections of cylindrical pipes and welding or riveting the ends together. With smaller ducts, the joints particularly for elbows can be prefabricated by spin forming overlapping U-shaped mating ends. Such construction, however, is not normally employed in commercial duct construction since the ductwork typically is significantly larger and of heavier gage and does not lend itself to prefabricated and assembled sections.

Although the practice of riveting or welding duct sections together has been commercially feasible, the time involved in assembling such ductwork employing such techniques at a job site is considerable and once sections of ducts are joined, the connection is essentially permanent and not easily changed. Thus, there exists a need for a duct joint construction which permits on-site fabrication and ease of assembly particularly for relatively heavy gage and large diameter ducts used in commercial installations.

SUMMARY OF THE PRESENT INVENTION

The system of the present invention satisifes this need by providing mating interconnecting and overlapping male and female sections on facing ends of adjacent ducts with the male section including a duct wall with an end thereof including an outwardly formed flange coupling the wall to a central flange having an axis parallel to the axis of the wall and radially outwardly offset therefrom, and an inwardly formed end flange coupled to the central flange. The mating female section includes a wall with an end formed to include an outwardly formed flange communicating between the wall and an end flange whose axis is parallel to the axis of the wall and radially and outwardly offset therefrom with an axial dimension slightly greater than that of the central flange of the male section so as to receive the male section. A clamping band circumscribes and overlies the junction of the male and female sections and includes fastening means for tensioning the band around the junction to provide an airtight seal therefor.

With such construction, duct sections and the joint construction can be fabricated on-site using conventional roll-forming techniques and adjacent joint sections of ducts can readily be adjusted with respect to one another to provide easy assembly and installation. Further, the fabrication and assembly is significantly faster than with prior known techniques. These and other features, advantages and objects of the present invention will become apparent upon reading the following description thereof together with reference to the accompanying drawings in which:

DETAILED DESCRIPTION OF THE PREFERRED EMBODIMENT

Figure 1:
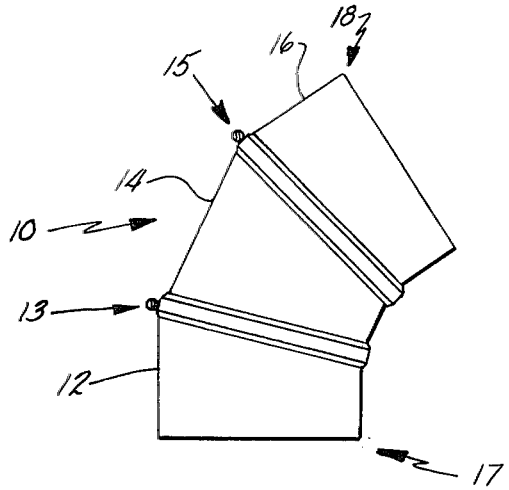
FIG. 1 is a side elevational view of an elbow incorporating the duct joint construction of the present invention.

In FIG. 1 there is shown an elbow 10 comprising three sections 12, 14 and 16 of galvanized ductwork coupled at junctions 13 and 15 by the joint construction embodying the present invention. Each of the sections 12, 14 and 16 are roll-formed from galvanized metal sheets having a gage of from 18-20 although lighter or heavier weight metal can be employed. The diameter of the ductwork will, in a typical installation, range anywhere from 12 to 36 inches in diameter for commercial heating and cooling systems. The elbow shown in FIG. 1 is a 45° elbow and the sections 12, 14 and 16 are accordingly formed and cut to approximately $22\frac{1}{2}°$ bent at each of the pipe junctions 13 and 15 between sections 12 and 14, and 14 and 16 respectively. It is noted that the open end of section 12 includes a female end joint 17 for receiving the male end of an adjacent section of ductwork not shown. Similarly, the open end of section 16 includes a male end joint 18 for connection to the mating female portion of an adjacent section of ductwork also not illustrated in FIG. 1. The details of the joint construction are now presented in connection with FIGS. 2 and 3 which are greatly enlarged views of junctions 15 shown in FIG. 1.

Figure 2:
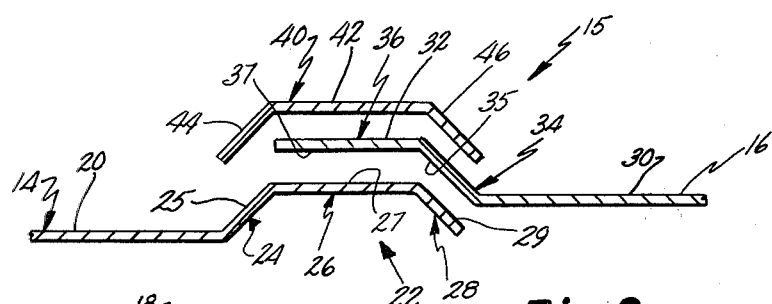
FIG. 2 is a greatly enlarged fragmentary and vertically expanded cross sectional view of the joint construction taken along the section lines II—II of FIG. 1.

Duct section 14 is generally cylindrical and includes a cylindrical wall 20 having a male joint section 22 roll-formed around the end adjacent duct section 16 as seen in FIG. 2. The male joint section includes an outwardly formed first flange or end wall 24 integral with and extending from the cylindrical sidewall 20 and extending radially outwardly and longitudinally at an angle of approximately 45° in the preferred embodiment. Integrally formed and connected to the first flange 24 is a second or center cylindrical flange 26 defining a ridge having an axis parallel to the longitudinal axis of the cylindrical wall 20. Flange 26 is radially outwardly offset from wall 20 thus having a diameter greater than that of the cylindrical section 14. Integrally formed as part of the male joint section 22 is an inwardly directed third end flange or wall 28 formed radially inwardly at an angle of approximately 45° from flange 26 to complete the structure. In one embodiment, the flange section 26 had a longitudinal width of approximately $\frac{1}{2}$ inch while sections 24 and 28 were slightly narrower, having a dimension of approximately 0.35 inches each. The outer surfaces 25, 27 and 29 associated with flanges 24, 26 and 28 respectively, form a mating and interengaging seal with the female joint section 32 and the clamping band 40 now described.

Figure 3:
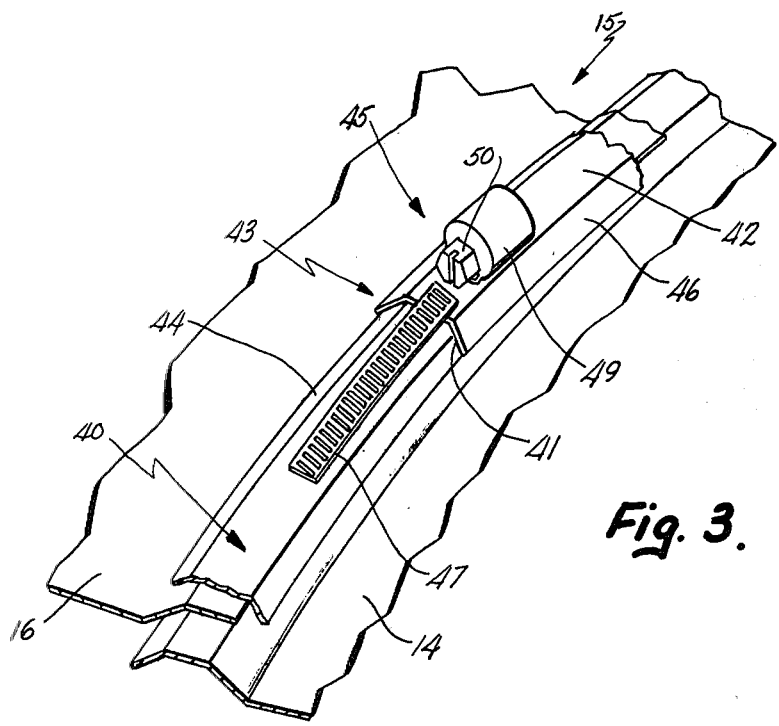
FIG. 3 is a greatly enlarged fragmentary perspective view of the fastening means for a clamping band employed with the joint construction of the present invention.

Duct section 16 has a cylindrical wall 30 which is terminated by female joint section 32 which is comprised of an outwardly formed fourth flange or skirt 34 integral with wall 30 and terminating in an end cylindrical fifth flange 36 having an axis parallel to the axis of the cylindrical wall 30 and radially outwardly offset therefrom to have a diameter greater than that of the cylindrical wall 30 and slightly greater than the diameter of the cylindrical center flange 26 of the male joint. Thus, in the preferred embodiment for an 18 inch diameter duct, typically the internal diameter of the female cylindrical flange 36 will be ⅛ inch greater than the outer diameter of the corresponding male cylindrical flange 26. This permits the assembly of the duct sections as shown in FIG. 3 by the insertion of the male end into the female end such that surface 29 of section 14 engages surface 35 of section 16 and surface 27 of section 14 engages surface 37 of section 16. FIG. 2 is vertically expanded so that the structure can be more clearly viewed. When the duct sections are actually joined, the various surfaces come into mating engagement as described.

The clamping or draw band 40 is formed of a strip of galvanized metal rolled into a generally cylindrical shape to form a parted band with facing ends 41. The band includes a center cylindrical section 42, the ends of which are inwardly formed into walls at an angle generally corresponding to the same angle as the end flanges 24 and 28 of section 14 and flange 34 of section 16. Walls 25 or end flanges 44 and 46 of clamp 40 are formed downwardly as shown in FIG. 2 at an angle of approximately 45° and have a width substantially equal to the width of flanges 24, 28 and 34. The center cylindrical section 42 has a longitudinal width substantially equal to or slightly less than the width of cylindrical flange 26. Band 40 thus overlies the flanges of the duct joint in a longitudinal direction and circumscribes the flanges in a circumferential direction.

Band 40 so formed has an overall length approximately one inch greater than the circumference of cylindrical flange 36 such that an overlap 43 (FIG. 3) exists between the ends 41 of the clamping band. Fastening means 45 for securing the free ends 41 of the band together and for tensioning the band is provided. The fastening means comprises a slotted strap 47 secured to one end of band 40 by, for example, spot welding and a screw thread mechanism 49 secured to the other free end of band 40 for receiving strap 47 and for drawing the ends of the band 40 together as the adjustment screw 50 of the fastening means 45 is rotated in a clockwise direction. The fastening member 45 can be, for example, a conventional stainless steel hose-type clamp with the slotted section 47 mounted as shown and the screw thread mechanism mounted as shown on the opposite and free end of the clamping band 40. Other suitable clamping mechanisms could also be employed.

The duct joint construction of the present invention and the ductwork on which it is employed can be formed on the job site by conventional roll-forming machinery starting with a flat sheet of galvanized metal which is first rolled to form a generally cylindrical section of ductwork secured at the mating edges by conventional riveting or welding. With the cylindrical duct so formed, the ends are roll-formed to form either a male duct joint 22 or a female duct joint 32 for sealably interfitting with a mating duct section. The clamping bands 40 are similarly roll-formed with the dies used for forming the male duct joint and the fastening means attached to the clamps. Naturally, the bands can be prefabricated if desired. During assembly of the ducts, the male end is fitted within the female end and the clamping band positioned in alignment therewith as shown in FIGS. 2 and 3 with the fastening means 45 tightened to secure the sections together. Before tightening the band, naturally the adjacent duct sections can be rotated relative to one another for directing angled ductwork in a desired manner. Inclined walls 44 and 46 of the band tend to exert an inwardly directed longitudinal compressive force to sections 14 and 16 through contact with inclined flanges 24 and 34 forcing the sections together while the center section 42 of the tensioned band secures members 26 and 36 together with a radially inwardly directed compressive force.

It will become apparent to those skilled in the art that various modifications to the preferred embodiment of the invention as described herein can be made without departing from the spirit or scope of the invention as defined by the appended claims.

The embodiment of the invention in which an exclusive property or privilege is claimed are defined as follows:

1. A joint assembly for ducts comprising:
a first section of duct defined by a wall having a first flange extending radially outwardly from said wall, a second flange extending from an end of said first flange axially aligned with and radially outwardly offset from said wall, and a third flange extending radially inwardly from an end of said second flange, said first, second and third flanges defining an end of said first section of duct; and having a wall thickness substantially the same as the wall thickness of said section of duct;
a second section of duct defined by a wall having a fourth flange extending radially outwardly and a fifth flange extending from an end of said fourth flange axially aligned with and radially outwardly offset from said wall of said second section of duct, said fourth and fifth flanges defining an end of said second section of duct having a diameter greater than that of said end of said first section of duct to receive in mating sealed engagement said third and second flanges respectively of said first section of duct; and
a band circumscribing and overlying said ends of said first and second sections of duct for securing the junction therebetween.

2. The assembly as defined in claim 1 wherein said first and second sections of duct are cylindrical.

3. The assembly as defined in claim 2 wherein said ends of said first and second sections of duct are integrally formed in the associated wall.

4. The assembly as defined in claim 3 wherein said band comprises an axially extending circumferential center portion and a pair of radially inwardly extending circumferential walls on opposite edges of said center portion for compressing said ends of said first and second sections of duct together in sealed engagement with one another.

5. The assembly as defined in claim 4 wherein said band is parted to include facing ends and includes means for adjustably coupling said ends to adjust the tension on said band and thereby the axial and radial compression placed on said ends of said first and second sections of duct by said band.

6. An elbow for a sheet metal conduit, said elbow having at least two cylindrical sections the axes of which are inclined to each other and having abutting circular ends of identical diameter, wherein the end of one of said sections has a radially outwardly offset circumferential ridge having axially spaced circumferentially extending inclined walls at opposite edges thereof; said one of said sections, circumferential ridge and inclined walls all having substantially the same wall thickness; the end of the other of said sections having a radially outwardly offset circumferential flange having an inner diameter to closely and slidably seat over said ridge and a single skirt portion to closely seat over the adjacent one of said end walls; a parted band having a cross sectional shape complementary to said flange when said ridge and flange are fitted together; and means for closing the part in said band for drawing said band around said ridge and flange to form an air-leak resisting seal between said cylindrical sections.

7. A joint assembly for ducts comprising:
- a first duct section integrally including at one end an axially aligned and radially offset flange extending longitudinally parallel with the axis of said first duct section and spanned on either side by a pair of inwardly inclined walls with one wall joining said flange to said first duct section; said first duct section, radially offset flange and pair of inwardly inclined walls all having substantially the same wall thickness;
- a second duct section integrally including at one end an axially aligned and radially offset flange extending longitudinally parallel with the axis of said second duct section and having a radial dimension greater than said flange associated with said first duct section and a single inwardly inclined wall coupling said second named flange to said second duct section; and
- means for securing said first duct section to said second duct section with said first named flange seated within said second named flange.

8. The assembly as defined in claim 7 wherein said first and second duct sections are cylindrical.

9. The assembly as defined in claim 8 wherein said means for securing said duct sections comprises a band circumscribing and overlying said flanges.

10. The assembly as defined in claim 9 wherein said band comprises an axially extending circumferential center portion and a pair of radially inwardly extending circumferential walls on opposite edges of said center portion for compressing said first and second duct sections together in sealed engagement with one another.

11. The assembly as defined in claim 9 wherein said band is parted to define free ends and includes means for adjustably coupling said ends to adjust the tension on said band and thereby the axial and radial compression placed on said flanges and said walls of said first and second duct sections by said band.

* * * * *